Patented Aug. 4, 1942

2,291,778

UNITED STATES PATENT OFFICE 2,291,778

SULPHONATED UNSYMMETRICAL KETONES

Reginald L. Wakeman, Pittsburgh, Pa., assignor to Allied Chemical & Dye Corporation, a corporation of New York No Drawing. Application September 30, 1939, Serial No. 297,277

9 Claims. (Cl. 260—511)

This invention relates to compositions of matter comprising mixtures of unsymmetrical ketones each of which contains on one side of the carbonyl group the residue of an aliphatic or alicyclic hydrocarbon, and on the other side an aryl radical. The invention also relates to processes of preparing such compositions of matter.

It is an object of the invention to provide compositions of matter comprising mixtures of unsymmetrical ketones, which compositions can be prepared in a simple manner from inexpensive and readily available raw materials. Another object of the invention is to provide compositions of matter which are soluble in water and possess surface active properties making them valuable for use as detergents, and wetting, dispersing, emulsifying, and the like agents. A further object of the invention is to provide an economical process for the production of compositions of matter containing mixtures of unsymmetrical ketones with the use of raw materials which are inexpensive and readily available. Other objects of the invention will in part be obvious and in part will appear hereinafter.

The compositions of matter of the invention are mixtures of organic compounds containing the unsymmetrical ketones which may be represented by the general formula,

in which R represents the residue of an aliphatic or alicyclic hydrocarbon present in a hydrocarbon mixture of the type of a petroleum distillate, which residue contains at least 8 carbon atoms, and preferably 10 to 14 carbon atoms, and R' represents an aryl radical, preferably an aryl radical of the benzene or naphthalene series, which aryl radical may contain substituents such as for instance alkyl, alkoxy, hydroxyl, and nitro groups. The aryl radical represented by R' may also contain one or more, preferably only one, sulphonate group (i. e., a free sulphonic acid group or a sulphonic acid group in the form of one of its salts such as an alkali metal, particularly sodium, ammonium or organic base salt). While, as pointed out, the aryl radical represented by R' may be substituted, it is free from acidic residues (other than the one or more sulphonate groups which may be present therein); i. e., it is free from non-sulphonic acid acidic residues, which tend to make compounds containing them soluble in neutral or alkaline aqueous solutions. The term "acidic residue" is used herein to designate free acid radicals, their salts, and their functional derivatives which are convertible by saponification into the corresponding free acid radical or into one of its water-soluble salts; e. g., nitriles, acid amides, halides, anhydrides, or esters. Thus the compositions of the invention contain mixtures of aliphatic-aromatic ketones and/or cycloaliphatic-aromatic ketones which may or may not contain sulphonate groups in the aryl radicals thereof, the said ketones differing from one another with respect to the residues of aliphatic or alicyclic hydrocarbons present therein. Since the compositions contain mixtures of unsymmetrical ketones rather than single compounds, they possess the varied and valuable properties of their constituents.

The compositions are prepared in accordance with the process of the present invention by condensing an aromatic carboxylic acid chloride or bromide that is free from acidic residues other than the carbonyl halide group, with a hydrocarbon mixture of the type of a petroleum distillate of which the major portion is composed of saturated hydrocarbons (i. e., saturated aliphatic and/or saturated alicyclic hydrocarbons) containing at least 8, and preferably 10 to 14 carbon atoms, in the presence of a catalyst for reactions of the Friedel-Crafts type, such as aluminum chloride. At the completion of this condensation reaction and after separation of inorganic materials, there is obtained a mixed product containing uncondensed hydrocarbons of the hydrocarbon mixture employed and unsymmetrical ketones containing on the one side of the carbonyl group the residue of an aliphatic or alicyclic hydrocarbon and on the other side the aryl radical of the aromatic carboxylic acid chloride or bromide. This product is preferably distilled to remove the uncondensed hydrocarbons and then to obtain fractions composed substantially of the unsymmetrical ketones, the fractions differing from one another in the average carbon content of the aliphatic and/or alicyclic residues present in the unsymmetrical ketones. These fractions may be employed separately or they may be combined to form a product composed of ketones of relatively widely divergent molecular weights.

Since the aromatic carboxylic acid chloride or bromide used in the above process is free from acidic residues oher than the carbonyl halide group, the mixed ketonic products are insoluble in aqueous solutions, but are soluble in hydrocarbon oils and the usual organic solvents. They are of interest for use in improving the properties of lubricating oils. Further, they are valuable raw materials for use in the production of organic compounds of various types. For example, they may be reduced to the corresponding nuclearly alkylated aromatic compounds by means of amalgamated zinc and hydrochloric acid or by hydrogenation in the presence of a catalyst. The resulting nuclearly alkylated aromatic compounds can be sulphonated to form valuable alkyl aryl sulphonates.

As a feature of the invention it has been found that by sulphonating the above described mixed ketonic products, valuable water-soluble compositions of matter containing unsymmetrical ketones having sulphonate groups in the aryl radicals can be obtained. The water-soluble compositions resulting from the sulphonation, which may be carried out in the usual manner of conducting sulphonations of aromatic compounds, have been found to possess surface active properties and therefore they may be used in processes where detergents, and wetting, dispersing, emulsifying, and the like agents are employed. They show good washing power and are useful as assistants in the laundry, textile, and associated industries. They may be used alone in aqueous solutions or in conjunction with other assistants such as soaps, detergents containing sulphonic acid or sulphuric acid ester groups, protective colloids, organic solvents, and soluble organic or inorganic salts. Furthermore, these water-soluble compositions are valuable raw materials for the production of other compositions. Thus they may be reduced to the corresponding alkyl aromatic sulphonic acids. Also, they, or the alkyl aromatic sulphonic acids prepared therefrom, may be fused with caustic alkali to replace the sulphonic acid groups by hydroxyl groups, thereby forming mixed alkyl or cycloalkyl keto phenols, or alkylated or cycloalkylated phenols. The alkyl or cycloalkyl keto phenols are included within the scope of the present invention. Also, these mixed keto phenols may be resulphonated to form water-soluble compositions of the invention.

The hydrocarbon mixture which is preferred for use in the present process is a petroleum distillate of which the major portion is composed of aliphatic and/or alicyclic hydrocarbons containing at least 8, and preferably 10 to 14, carbon atoms. Examples of such hydrocarbon mixtures are kerosenes such as are derivable from paraffinic petroleums, particularly Pennsylvania or Mount Pleasant, Michigan, petroleums. As is well known, petroleum distillates such as kerosenes are mainly mixtures of saturated straight and branched chain hydrocarbons of the aliphatic series and hydrocarbons of the alicyclic series. Such mixtures may contain various proportions of unsaturated and/or aromatic constituents depending upon the source of petroleum, but such constituents are generally present in relatively small amounts and are usually removed to a considerable extent in the refining process. The petroleum distillates used in the present process are composed substantially entirely of aliphatic and alicyclic hydrocarbons. The said distillates boil over a temperature range which does not extend substantially below 140° C. at normal atmospheric pressure. The preferred distillates boil substantially completely within the temperature range of 170° to 270° at normal atmospheric pressure. The hydrocarbons which make up the major portion of a petroleum distillate of the latter type contain about 10 to about 14 carbon atoms in the molecule. While petroleum distillates containing a large proportion of aliphatic and alicyclic hydrocarbons having more than 14 carbon atoms may be used in the present process, they are not preferred because the separation of the desired fractions from the reaction mixture which results from the condensation with the aromatic acid chloride or bromide increases in difficulty with increase in the average molecular weight of the hydrocarbons in the distillate. This is because of the difficulty in distilling high-boiling reaction products.

As noted above, aromatic carboxylic acid chlorides or bromides may be employed for condensation with the hydrocarbon mixture which are unsubstituted or which contain substituents that are not acidic residues and do not interfere to any appreciable extent with condensation reactions of the Friedel-Crafts type, such as for instance alkyl, alkoxy, hydroxyl, and nitro groups. In general, it is preferred to employ aromatic carboxylic acid chlorides of the benzene or naphthalene series because more valuable products usually result from their use, and as compared with the bromides, the chlorides are of low cost. Examples of suitable aromatic carboxylic acid chlorides and bromides adapted for use in the present process are the following: benzoyl chloride, alpha-naphthoyl chloride, benzoyl bromide, 4-nitro benzoyl chloride, meta-toluyl chloride, and ortho- or para-methoxy benzoyl chloride.

In carrying out the present process in accordance with a preferred manner of proceeding, a kerosene fraction of petroleum of the character described above boiling within the range of 170° to 270° C. at atmospheric pressure is condensed with benzoyl or alpha-naphthoyl chloride. The petroleum fraction can be used in an amount such that one mol equivalent, calculated on the basis of the average molecular weight of the hydrocarbons contained therein, is present for each mol of the aromatic carboxylic acid chloride, but in order to utilize the aromatic carboxylic acid chloride to a greater extent, it is preferred to use an excess over this amount. From 1.5 to 4 mols of the petroleum fraction for each mol of the chloride have been found to be a convenient ratio of these reactants. Substantially anhydrous aluminum chloride is preferably employed as a condensation catalyst and is ordinarily used in the proportions of about 1 to 1.5 mols for each mol of the aromatic carboxylic acid chloride.

To effect the condensation, the petroleum fraction, aromatic carboxylic acid chloride, and aluminum chloride are mixed and heated together under atmospheric pressure or superatmospheric pressure. During the reaction, hydrogen chloride is evolved and completion of the reaction is evidenced by substantial cessation of evolution of this gas. The reaction temperature is maintained sufficiently low to avoid appreciable cracking of the hydrocarbons in the petroleum fraction and sufficiently high to cause the reaction to proceed at a moderate rate. Temperatures between 50 and 150° C. have been found to be satisfactory. Under these conditions the reaction is completed in about 10 to 20 hours. After the reaction is completed, the reaction mixture is drowned in a large quantity of cold water which is acidified with a mineral acid. The metallic salts present in the reaction mixture (e. g., aluminum chloride) dissolve in the aqueous solution, and the ketonic condensation products and the unreacted hydrocarbons separate as an oily liquid. The oily layer is decanted and washed, first with a dilute solution of sodium carbonate to remove acids, and finally with water.

The product thus obtained, which contains a large proportion of ketones, may be sulphonated directly so as to convert it into a water-soluble product of the invention. In accordance with preferred practice, however, it is first fractionated by distillation under reduced pressure. In this way, particularly valuable water-insoluble products are obtained. Also, these products are in an especially good condition for sulphonation. The low boiling fraction obtained in the distillation consists principally of unreacted hydrocarbons and may be used again in a subsequent condensation. The higher boiling fractions, which are chiefly unsymmetrical ketones, may be collected separately and used as such or subjected to further treatment; or the entire distillate may be used without separation.

To prepare water-soluble compositions of the invention, one or all of the high boiling fractions are subjected to sulphonation so as to introduce sulphonic acid groups into the aryl radicals of the unsymmetrical ketones. This sulphonation may be effected with, for example, concentrated sulphuric acid, oleum, sulphur trioxide or chlorsulphonic acid, and in the presence or absence of an inert organic solvent such as trichlorethylene, dichlorbenzene, and the like, and a sulphonation aid such as an acid anhydride or chloride. In order to avoid excessive decomposition, the temperature during sulphonation is kept as low as the activity of the sulphonating agent will permit. In general, temperatures below 100° C. are used, and in the cases of the sulphonating agents which are more energetic than 100 per cent sulphuric acid; for instance, oleum or chlorsulphonic acid, temperatures below 50° C. are preferably used. For example, in sulphonations carried out with the use of 26 per cent oleum, a temperature of about 30° C. is employed. The sulphonation product obtained at the completion of the sulphonation may be isolated in the form of the free acids or in the form of their alkali metal or ammonium salts in the usual manner.

While anhydrous aluminum chloride is preferably used as the condensation catalyst, other catalysts which are effective in condensations of the Friedel-Crafts type may be used; for instance, aluminum bromide, ferric chloride, or zinc chloride.

The following example offers an illustration of one manner of carrying out the present process to produce products of the invention. The parts are by weight.

*Example, part 1.*—300 parts of a kerosene which boils substantially within the temperature range from about 170° to about 200° C. at atmospheric pressure, and corresponds to a mixture of aliphatic hydrocarbons which have a molecular carbon content from about 10 to about 11 carbon atoms, are added to a mixture of 150 parts benzoyl chloride and 155 parts of anhydrous aluminum chloride. The temperature of the reaction mixture is maintained between 60° C. and 70° C. for about 16 hours. At the end of this period evolution of hydrogen chloride has practically ceased. The reaction mixture is added to a relatively large amount of water containing a small amount of hydrochloric acid, at a temperature of between 0° C. and 5° C. The oily product which forms is separated from the aqueous solution, and washed successively with a dilute aqueous solution of sodium carbonate, and then with water. The oily product is fractionally distilled under reduced pressure. The following fractions are obtained:

| Fraction | Boiling range | Absolute pressure | Amount of distillate |
|---|---|---|---|
| | °C. | | Parts |
| 1 | 80–120 | 30 mm. of Hg | 132 |
| 2 | 120–155 | 20 mm. of Hg | 39 |
| 3 | 155–190 | 22 mm. of Hg | 9 |
| 4 | 190–250 | 25 mm. of Hg | 94 |
| 5 | 250–350 | 25 mm. of Hg | 22 |

The initial fraction which distills between 80° C. and 120° C. at 30 mm. of mercury (absolute pressure) consists chiefly of unreacted kerosene. The higher boiling fractions are condensation products which consist chiefly of aliphatic-aromatic ketones. These fractions are valuable products and may be used for any of the purposes mentioned above. Preferably, however, they are converted into water-soluble products by sulphonation as described in Part 2 of this example having to do with fraction 4.

*Part 2.*—25 parts of the product designated as fraction 4, distilling between 190° and 250° C. under an absolute pressure of 25 mm. of mercury are diluted with 38 parts of carbon tetrachloride. 23.2 parts of 26 per cent oleum are added dropwise to this carbon tetrachloride solution at such a rate that the temperature of the reaction mixture does not rise above 30° C. After all of the oleum has been added, the mixture is agitated for about 6 hours and then poured into about 500 parts of water with vigorous agitation. The liquid is then allowed to separate into layers, and the upper aqueous layer is decanted. Carbon tetrachloride is recovered as the lower oily layer. The decanted aqueous solution of the sulphonation product is neutralized with caustic soda, and evaporated to dryness. The dry product is characterized by good detergent properties.

In a similar manner, by the use of other hydrocarbon mixtures of the type of a petroleum distillate and other aromatic carboxylic acid chlorides or aromatic carboxylic acid bromides, for example, one of those specifically mentioned above, other water-insoluble and water-soluble products of the invention can be prepared.

Since changes may be made in the above-described processes and products without departing from the scope of the invention, it is intended that all matter contained in the above description shall be interpreted as illustrative and not in a limiting sense.

I claim:

1. A water-soluble mixture of sulphonated unsymmetrical ketones containing on one side of the carbonyl group an aryl radical which contains a sulphonate group but is free from non-sulphonic acid acidic residues, and on the other side of the carbonyl group a residue selected from the group consisting of residues of aliphatic and alicyclic hydrocarbons which contain at least 8 carbon atoms and which are present in a hydrocarbon mixture of the type of a petroleum distillate, said mixture being obtained by sulphonating a product prepared by condensing in the presence of a catalyst for reactions of the Friedel-Crafts type an aromatic carboxylic acid chloride, free from acidic residues other than the carbonyl chloride group, with a hydrocarbon mixture of the type of a petroleum distillate of which the major portion is composed of hydrocarbons selected from the group consisting of aliphatic and alicyclic hydrocarbons containing at least 8 carbon atoms.

2. A water-soluble mixture of sulphonated unsymmetrical ketones containing on one side of the carbonyl group an aryl radical selected from the group consisting of the aryl radicals of the benzene and naphthalene series which contains a sulphonate group but is free from non-sulphonic acid acidic residues, and on the other side of the carbonyl group a residue selected from the group consisting of residues of aliphatic and alicyclic hydrocarbons which contain 10 to 14 carbon atoms and which are present in a hydrocarbon mixture of the type of a petroleum distillate, said mixture being obtained by sulphonating a product prepared by condensing in the presence of anhydrous aluminum chloride an aromatic carboxylic acid chloride selected from the group consisting of aromatic carboxylic acid chlorides of the benzene and naphthalene series, free from acidic residues other than the carbonyl chloride group, with a hydrocarbon mixture of the type of a petroleum distillate of which the major portion is composed of hydrocarbons selected from the group consisting of aliphatic and alicyclic hydrocarbons containing 10 to 14 carbon atoms.

3. A water-soluble mixture of sulphonated unsymmetrical ketones containing on one side of the carbonyl group an aryl radical of the benzene series which contains a sulphonate group but is free from non-sulphonic acid acidic residues, and on the other side of the carbonyl group a residue selected from the group consisting of residues of aliphatic and alicyclic hydrocarbons which contain 10 to 14 carbon atoms and which are present in a petroleum distillate, said mixture being obtained by sulphonating a product prepared by condensing in the presence of anhydrous aluminum chloride an aromatic carboxylic acid chloride of the benzene series, free from acidic residues other than the carbonyl chloride group, with a petroleum distillate of which the major portion is composed of hydrocarbons selected from the group consisting of aliphatic and alicyclic hydrocarbons containing 10 to 14 carbon atoms.

4. A water-soluble mixture of sulphonated unsymmetrical ketones containing on one side of the carbonyl group an aryl radical of the benzene series which contains a sulphonate group but is free from non-sulphonic acid acidic residues, and on the other side of the carbonyl group a residue selected from the group consisting of residues of aliphatic and alicyclic hydrocarbons which contain at least 8 carbon atoms and which are present in a petroleum distillate of which the major portion is composed of hydrocarbons selected from the group consisting of aliphatic and alicyclic hydrocarbons and of which the boiling temperature range does not extend substantially below 140° C. at atmospheric pressure, said mixture being obtained by sulphonating a product prepared by condensing in the presence of anhydrous aluminum chloride an aromatic carboxylic acid chloride of the benzene series, free from acidic residues other than the carbonyl chloride group, with a petroleum distillate of which the major portion is composed of hydrocarbons selected from the group consisting of aliphatic and alicyclic hydrocarbons containing at least 8 carbon atoms and of which the boiling temperature range does not extend substantially below 140° C. at atmospheric pressure.

5. A water-soluble mixture of sulphonated unsymmetrical ketones containing on one side of the carbonyl group a benzene radical which contains a sulphonate group but is free from non-sulphonic acid acidic residues, and on the other side of the carbonyl group a residue selected from the group consisting of residues of aliphatic and alicyclic hydrocarbons which contain 10 to 14 carbon atoms and which are present in a petroleum distillate of which the major portion is composed of hydrocarbons selected from the group consisting of aliphatic and alicyclic hydrocarbons and which boils substantially within the range of 170° to 270° C. at atmospheric pressure, said mixture being obtained by sulphonating a product prepared by condensing in the presence of anhydrous aluminum chloride benzoyl chloride with a petroleum distillate of which the major portion is composed of hydrocarbons selected from the group consisting of aliphatic and alicyclic hydrocarbons containing 10 to 14 carbon atoms and which boils substantially within the range of 170° to 270° C. at atmospheric pressure.

6. The process for the preparation of mixtures of sulphonated unsymmetrical ketones selected from the group consisting of aliphatic-aromatic and cycloaliphatic-aromatic ketones which comprises condensing in the presence of a catalyst for reactions of the Friedel-Crafts type an aromatic carboxylic acid chloride of the benzene series, free from acidic residues other than the carbonyl chloride group, with a petroleum distillate of which the major portion is composed of hydrocarbons selected from the group consisting of aliphatic and alicyclic hydrocarbons and which boils substantially within the range of 170° to 270° C. at atmospheric pressure, and sulphonating a resulting condensation product.

7. The process for the preparation of mixtures of sulphonated unsymmetrical ketones selected from the group consisting of aliphatic-aromatic and cycloaliphatic-aromatic ketones which comprises condensing in the presence of anhydrous aluminum chloride an aromatic carboxylic acid chloride of the benzene series, free from acidic residues other than the carbonyl chloride group, with a petroleum distillate of which the major portion is composed of hydrocarbons selected from the group consisting of aliphatic and alicyclic hydrocarbons and which boils substantially within the range of 170° to 270° C. at atmospheric pressure, separating the resulting condensation mixture into fractions by distillation, and sulphonating a high boiling fraction.

8. The process for the preparation of mixtures of sulphonated unsymmetrical ketones selected from the group consisting of aliphatic-aromatic and cycloaliphatic-aromatic ketones which comprises condensing benzoyl chloride in the presence of anhydrous aluminum chloride with a petroleum distillate of which the major portion is composed of hydrocarbons selected from the group consisting of aliphatic and alicyclic hydrocarbons and which boils substantially within the range of 170° to 270° C. at atmospheric pressure, separating the resulting condensation mixture into fractions by distillation, and sulphonating a high boiling fraction.

9. The process for the preparation of mixtures of sulphonated unsymmetrical ketones selected from the group consisting of aliphatic-aromatic and cycloaliphatic-aromatic ketones which comprises heating a mixture containing one mol of benzoyl chloride, about 1 to 4 mols of a petroleum distillate of which the major portion is composed of hydrocarbons selected from the group consisting of aliphatic and alicyclic hydrocarbons and which boils substantially within the range of 170° to 270° C. at atmospheric pressure, and about 1 to 1.5 mols of anhydrous aluminum chloride at a temperature of 50° to 150° C. for 10 to 20 hours to effect condensation between hydrocarbons in the petroleum distillate and form unsymmetrical ketones, recovering the organic constituents of the resulting mixture, separating the organic constituents into fractions by distillation under reduced pressure, and sulphonating a high boiling fraction.

REGINALD L. WAKEMAN.